April 19, 1955  C. W. ROSE  2,706,423
TOOL HOLDER
Filed May 22, 1950
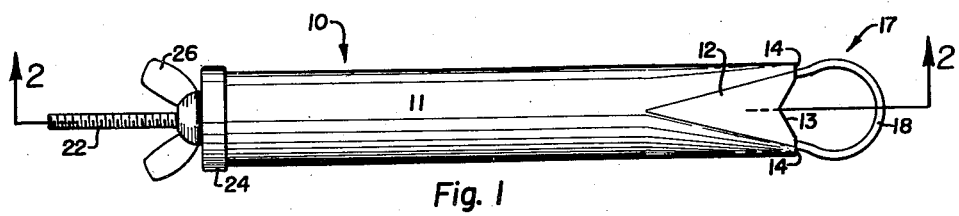
Fig. 1
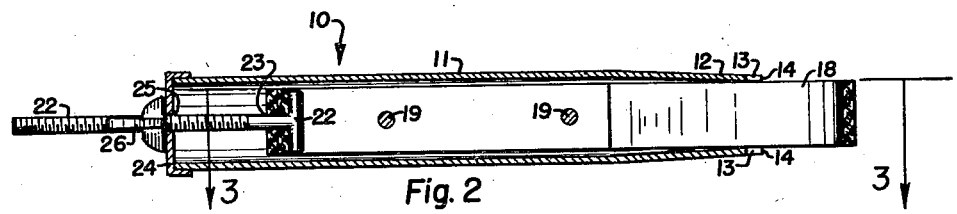
Fig. 2
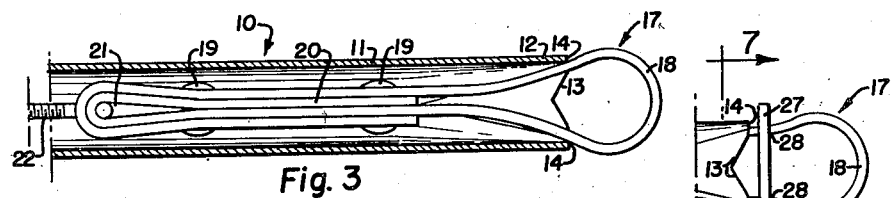
Fig. 3
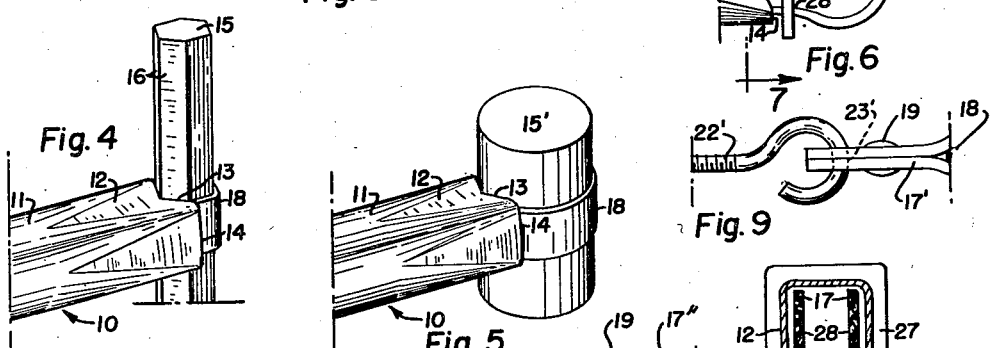
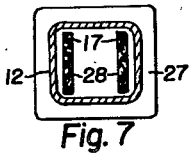
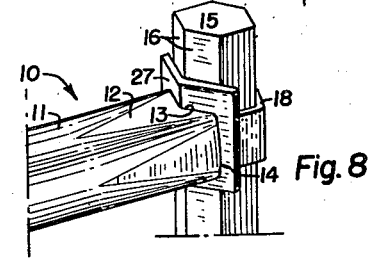
Inventor
CLARENCE W. ROSE
By WHITEHEAD & VOGL
PER *Earle Whitehead*
Attorneys

United States Patent Office 2,706,423
Patented Apr. 19, 1955

2,706,423

TOOL HOLDER

Clarence W. Rose, Denver, Colo.

Application May 22, 1950, Serial No. 163,535

5 Claims. (Cl. 81—1)

This invention relates to tool gripping devices, and more particularly to a handle adapted to grip and hold the shank of tools such, for example, as chisels, and has as an object to provide a new and improved gripping handle which is adapted to hold a wide variety of tools of various sizes and shapes, "chisel" where used hereinafter being representative of such tools.

Another object of this invention is to provide a new and improved gripping handle which is adapted to hold the shank of a chisel while hammer blows are struck thereon, thereby eliminating the danger of such injury as would result from an improperly aimed hammer blow were the chisel held directly by hand.

Another object of this invention is to provide a new and improved gripping handle which holds the shank of a tool against the end of the handle in a tight but resilient grip whereby shock movements such as necessarily occur between the handle and tool, as the tool is struck a blow, are damped out and slippage of the tool in the handle is eliminated.

Yet another object of this invention is to provide a new and improved gripping handle which holds the shank of a tool in a tight but resilient grip, and which, in one embodiment insulates the handle from the tool to thereby prevent any passage of electrical charge from the tool to the handle.

A further object of this invention is to provide a new and improved gripping handle which holds the shank of a tool in a tight but resilient grip, the nature of the holding means being such that percussion shocks occurring in the tool, as when it is struck an improperly aimed blow, are not transmitted to the handle to sting or paralyze the hand of the operator.

Yet a further object of this invention is to provide a new and improved gripping handle having the desirable characteristics above mentioned, yet which is exceedingly simple in construction and operation, which may be manufactured at a low unit cost, and which is strong, rugged and durable over a long period of actual use.

With these and further objects in view, all of which more fully hereinafter appear, my invention comprises certain new and novel constructions, combinations and arrangements of elements as will now be described and as defined in the appended claims, and illustrated, in preferred embodiment, in the accompanying drawing, in which:

Figure 1 is a plan of the improved gripping handle.

Figure 2 is a longitudinal section of the handle as taken on the indicated line 2—2 at Fig. 1.

Figure 3 is a fragmentary section of the handle as taken on the indicated line 3—3 at Fig. 2.

Figure 4 is an isometric view of the end of the handle illustrating the manner in which it grips a hexagonal shaft of a tool.

Figure 5 is similar to Fig. 4 but illustrates the device gripping a larger circular shaft, the shaft being shortened to permit its use as a mallet with the gripping device serving as a handle.

Figure 6 is a view of the end portion of the handle as shown at Fig. 1, but illustrating a modified construction.

Figure 7 is a section as taken on the indicated line 7—7 at Fig. 6.

Figure 8 is similar to Fig. 4 but illustrating the modified handle of Fig. 6 holding a hexagonal shaft.

Figure 9 is a fragmentary detail illustrating an alternative construction of connective elements shown at Fig. 3.

Figure 10 is a fragmentary detail, similar to Fig. 9, but showing yet another alternative construction of the connective elements.

An accepted hazard where chisels and other such tools are used for cutting or punching by striking with a hammer is that an improperly aimed hammer blow will cause a percussion shock in the tool to sting or paralyze the hand of the operator, or even cause the chisel to be displaced in or fly from the hand of the operator and smash his fingers or do other damage. To obviate this danger, various devices, such as tongs, have been used to hold the tools which are struck, and thereby permit the operator to grip the tool through the tongs with comparative safety. The present invention is of this general class, but it is a tool gripping handle which is much simpler than any presently used device, yet is adapted to maintain a firm though resilient grip on the shank of a tool, whatever the shank shape, and has other improved features and functions which hereinafter appear.

In the preferred embodiment the handle 10 is formed of a suitable length of tubular material 11 having the tool gripping end 12 squared in section to provide two oppositely-spaced tool-abutting edges 13 between upright edges 14, said tool-abutting edges 13 being notched or V'd to form a seat for tool shank 15 as clearly illustrated at Fig. 4. It follows that the positioning of the tool-abutting edges 13 with respect to each other will determine the angle of the tool shank 15 with respect to the handle, and with the edges 13 symmetrically and squarely positioned with respect to each other, the tool shank 15 will be positioned perpendicular to the longitudinal axis of the handle 10. In conventional construction the tool shanks are round or hexagonal, and the angle of the notch in the edges 13 is such as to snugly fit two sides 16 of a hexagonal shaft, or to hold a circular shaft 15' in firm two-point contact against the edges 13; also, the notch of the edges 13 will permit tight gripping of a shaft other than hexagonal or circular by having one side 16 of such shaft bear against one side of the edges 13 with a corner of the shaft at the corner of the notch.

The tool shank 15 is drawn against the edges 13 by a looped strap 17 which is carried inside the handle 10 with the loop 18 extending from the tool abutting end whereby the strap 17 may be placed over the tool shank 15 as clearly illustrated at Figs. 4 and 5. This strap 17 is preferably formed of resilient fiber-reinforced material, such as rubberized belting, and is of a width to permit it to slidingly extend from the handle between the tool-abutting edges 13, with the sides of the loop 18 adjacent the upright edges 14. The loop 18 is of sufficient size to encompass a relatively large tool shank although its effective size may be varied and depends upon the distance it is projected from or drawn into the handle 10. Beyond the loop, inside the handle, the ends of the strap 17 are doubly lapped and the lapped ends secured by rivets 19 to form a rigid body portion 20 and a small loop 21 at the extreme inner end of the member. In this loop 21 there is positioned the head of a T-bolt 22, the shaft of the T-bolt from the loop 21 through a suitable orifice 23 in the strap forming the loop and along the longitudinal axis of the handle 10.

This T-bolt is of sufficient length to extend through the handle 10, and the butt of the handle is covered by a cap 24 provided with a suitable orifice 25 through which the shaft of the T-bolt extends. A wing-nut 26, threaded onto the extended end of the bolt, completes the assembly, and through turning this wing-nut 26 the T-bolt pulls the strap into the body 10, thereby lessening the size of the loop 18 and pulling it tightly around the shank of the tool, thereby securing the tool to the handle with a firm grip.

By shortening the length of the body 20 and extending the length of the loop 18 and the T-bolt 22, the size of the loop may be varied to accommodate a very small shank or a comparatively large shank as clearly suggested by a comparison of Figs. 4 and 5.

The strap may be formed of a metal strip for certain uses; however, it was discovered that a resilient, reinforced, rubber-like material functions best for this purpose, because the tool shank, although held tightly, will yield slightly to dampen out, between the handle and tool, shock movements resulting from hammer blows on the tool, and then return to the initial position so that the resilience of the strap keeps the tool in place and prevents its slipping. Moreover, a percussion shock will not be transmitted as readily to the handle 10 for the yielding character of the loop dampens out a greater part of the shock.

In a modified embodiment of the present invention, a shield plate 27, formed of suitable resilient fibre-reinforced material similar to the strap 17, is interposed between the tool-gripping end of the handle and the loop 18, suitable slotted orifices 28 being cut in the plate 27 through which to pass the strap 17 as illustrated at Figs. 6, 7 and 8. In using this embodiment, tool shank 16 is positioned in the loop with the plate 27 between the tool shank and the end of the handle 10 whereby when the loop is drawn up, as by tightening the wing-nut 26, the plate 27 is flexed to rest between the end of the handle and the tool shank as clearly illustrated at Fig. 8. This modification includes mechanical insulation between the tool shank and the handle as well as an electrical insulation of the handle from the tool, which is advantageous, especially where there is likelihood of the tool receiving an electric charge.

As further alternatives of construction the manner of connecting the strap 17 with the bolt 22 may be varied. One construction anticipates that the strap 17' forms the loop 18, and that the ends thereof then be directly joined and held by a rivet 19, and further at the end portion beyond the rivet there be provided an orifice 23' through which the loop of an eye-bolt 22' may be inserted, all as clearly illurstrated at Fig. 9. A still further modification anticipates that the strap 17" be looped with the ends joined by a rivet 19, and with the loop of an eye bolt 22", carried by the rivet 19 between ends of the strip.

Further uses of the handle may be found by operators in various trades, one being the forming of mallets, such as the construction at Fig. 5, the cylindrical shank 15' being shortened to provide a mallet head.

With such use a quick change from one type of mallet head to another is easily made.

While I have illustrated and described many details of a preferred construction of my invention, alternatives and equivalents, which are within the scope and spirit of my invention, will occur to those skilled in the art, and it is my desire that my protection be limited, not by such details but only by the spirit and proper scope of the appended claims.

I claim:
1. A gripping handle for the shank of a tool including, in combination, a tubular member, a strap doubled upon itself to form a loop and having two reaches slidably encased within the member with said loop extending from one end of said member, a nut seated against the other end of said member, said strap having a second loop at its end within the member, an elongate headed bolt seated within said second loop and being threaded into said nut whereby rotation of the nut will draw the strap within the member and contract said first loop.

2. A tool holder adapted to grasp the shank of a tool including a hollow handle having a plate-shielded abutment at one end, a flexible band within the handle having a loop extending outwardly from said abutment end and adapted to encompass a tool shank and means for retracting the loop within the handle and thereby forcing and holding the tool shank against said shielded abutment, the tool grasping elements having, at their tool shank contacting surfaces, resilience in directions parallel to the tool axis.

3. A tool holder adapted to grasp the shank of a tool including a hollow handle having an abutment at one end, a shield plate at said abutment, a flexible band within the handle having a loop extending outwardly from said abutment end and adapted to encompass a tool shank, means for retracting the loop within the handle and thereby forcing and holding the shank against the shield plate at the abutment, said loop and shield plate having, at their tool shank contacting surfaces, resilience in directions parallel to the tool axis.

4. The holder defined in claim 3 wherein the loop and the shield plate are composed of rubber-like, fibre-reinforced, material.

5. The holder defined in claim 3 wherein said shield plate is formed as a washer orificed to permit the loop to extend therethrough.

References Cited in the file of this patent

UNITED STATES PATENTS

| | | |
|---|---|---|
| 1,200,158 | Barrett | Oct. 3, 1916 |
| 1,615,488 | Schleicher | Jan. 25, 1927 |
| 1,821,356 | Newton | Sept. 1, 1931 |
| 1,898,409 | Underwood | Feb. 21, 1933 |
| 2,422,715 | Blake | June 24, 1947 |

FOREIGN PATENTS

| | | |
|---|---|---|
| 123,308 | Switzerland | Nov. 1, 1947 |